(12) United States Patent
Tanji et al.

(10) Patent No.: US 11,248,704 B2
(45) Date of Patent: Feb. 15, 2022

(54) METAL GASKET

(71) Applicant: NOK CORPORATION, Tokyo (JP)

(72) Inventors: Isao Tanji, Fukushima (JP); Takeshi Watanabe, Fukushima (JP); Kazuya Aihara, Fukushima (JP)

(73) Assignee: NOK CORPORATION, Tokyo (JP)

( * ) Notice: Subject to any disclaimer, the term of this patent is extended or adjusted under 35 U.S.C. 154(b) by 38 days.

(21) Appl. No.: 16/060,831

(22) PCT Filed: Dec. 9, 2016

(86) PCT No.: PCT/JP2016/086661
§ 371 (c)(1),
(2) Date: Jun. 8, 2018

(87) PCT Pub. No.: WO2017/099206
PCT Pub. Date: Jun. 15, 2017

(65) Prior Publication Data
US 2018/0347699 A1 Dec. 6, 2018

(30) Foreign Application Priority Data
Dec. 11, 2015 (JP) .............................. JP2015-242015

(51) Int. Cl.
*F16J 15/08* (2006.01)
(52) U.S. Cl.
CPC ....... *F16J 15/0825* (2013.01); *F16J 15/0818* (2013.01)
(58) Field of Classification Search
CPC ... F16J 15/0818; F16J 15/0825; F16J 15/0856
See application file for complete search history.

(56) References Cited

U.S. PATENT DOCUMENTS 4,468,044 A * 8/1984 Ulmer .................... F16J 15/123
277/596
4,915,398 A 4/1990 Kitagawa
(Continued)

FOREIGN PATENT DOCUMENTS

CN 103635724 A 3/2014
CN 103797286 A 5/2014
(Continued)

OTHER PUBLICATIONS

Official Communication issued in International Bureau of WIPO Patent Application No. PCT/JP2016/086661, dated Mar. 14, 2017.
(Continued)

*Primary Examiner* — Christine M Mills
*Assistant Examiner* — L. Susmitha Koneru
(74) *Attorney, Agent, or Firm* — Greenblum & Bernstein, P.L.C.

(57) ABSTRACT

A metal gasket exhibiting an excellent seal effect on external foreign matter, such as salt water, and having low reaction force when required sealing pressure is low. The metal gasket, which is sandwiched between a pair of housings to seal the internal space of the housings and prevent entrance of external foreign matter between the housing and the gasket, has a straight portion, where the entire surface from an inner peripheral edge portion to an outer peripheral edge portion is a planar shape. A bent bead portion, directed obliquely outward and contacting one of the housings, is integrally provided in the outer peripheral edge portion of the straight portion. The bent bead portion functions as both an inward seal sealing the internal space and an outward seal preventing the entrance of external foreign matter between the housing and the gasket.

16 Claims, 6 Drawing Sheets

(56) References Cited

U.S. PATENT DOCUMENTS

| | | | | |
|---|---|---|---|---|
| 6,045,139 | A | * | 4/2000 | Kinoshita ............ F16J 15/0818 277/594 |
| 6,315,303 | B1 | | 11/2001 | Erb et al. |
| 6,422,573 | B1 | * | 7/2002 | Sekioka ............... F16J 15/0818 277/594 |
| 6,783,132 | B2 | * | 8/2004 | Nakamura ........... F16J 15/0818 277/592 |
| 2002/0000695 | A1 | * | 1/2002 | Izumi ................. F16L 19/0218 277/590 |
| 2003/0075873 | A1 | * | 4/2003 | Nakamura ........... F16J 15/0818 277/593 |
| 2004/0113370 | A1 | | 6/2004 | Beutter |
| 2006/0261561 | A1 | * | 11/2006 | Heilig .................. F16J 15/0825 277/593 |
| 2008/0197580 | A1 | * | 8/2008 | Imai ..................... F16J 15/0825 277/595 |
| 2011/0001295 | A1 | * | 1/2011 | Egloff .................. F16J 15/0818 277/592 |
| 2011/0182722 | A1 | | 7/2011 | Matsuyama |
| 2015/0211637 | A1 | * | 7/2015 | Aihara ................. F16J 15/0825 277/654 |
| 2018/0347699 | A1 | * | 12/2018 | Tanji .................... F16J 15/0825 |

FOREIGN PATENT DOCUMENTS

| | | |
|---|---|---|
| CN | 104105908 A | 10/2014 |
| JP | S57-10445 | 1/1982 |
| JP | 63-158360 | 7/1988 |
| JP | H08-312785 A | 11/1996 |
| JP | H11-336902 A | 12/1999 |
| JP | 2002-5291 | 1/2002 |
| JP | 2003-314363 A | 11/2003 |
| JP | 2007-315476 | 12/2007 |
| JP | 2013-61002 | 4/2013 |
| WO | 2009/022448 | 2/2009 |
| WO | 2016/104100 | 6/2016 |

OTHER PUBLICATIONS

Chinese Office Action, Chinese Patent Office, Application No. 201680067020.8, dated May 29, 2019, 5 pages.

Japanese Office Action, Japanese Patent Office, Application No. 2017-555151, dated May 22, 2019, 3 pages.

\* cited by examiner

METAL GASKET

BACKGROUND OF THE INVENTION

Field of the Invention

The present invention relates to a gasket relating to a sealing technique and more specifically relates to a plate-shaped metal gasket having a bead structure on the plane. The metal gasket of the present invention is used in the automobile-related field or used in the field of a general industrial machine or the like, for example.

Description of the Conventional Art

For example, the metal gasket for use in the automobile-related field is sometimes subjected to a salt spray test as a specification evaluation item in order to prepare for the situation where an automobile travels a seaside area, an area where a snow melting agent is sprinkled in a cold district, or the like (particularly when electronic components and the like are stored in a housing or when there is a possibility that salt water, a snow melting agent, or the like adheres to an engine room, for example). In this case, when a mating housing to which the metal gasket is to be attached is made from an aluminum alloy (ADC12 or the like), salt water stays (adheres) in a crevice between the metal gasket and the housing, so that drying and wetting are repeated, whereby corrosion (crevice corrosion) of the aluminum alloy due to the salt water (ion concentration difference) occurs. The metal gasket exhibits a seal function by the reaction force of the bead structure contacting the housings. However, when the corrosion portion of the housings penetrates the seal line formed by the bead structure, the seal function is impaired. Even when the housings are formed from an iron-based material, the corrosion occurs. However, the ionization tendency of aluminum is higher than that of the iron-based material, and therefore the corrosion is particularly likely to occur.

Figure 5A:
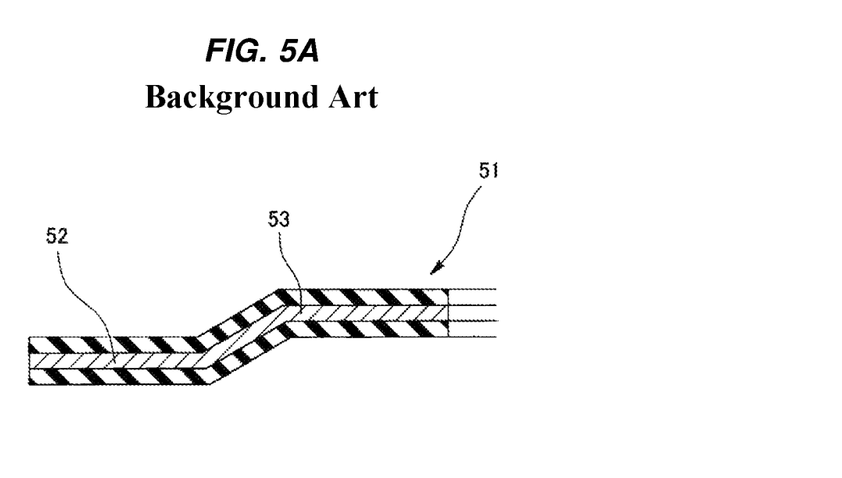
FIG. 5A is a cross-sectional view of a principal portion thereof and FIG. 5B is a cross-sectional view of a principal portion illustrating the attachment state thereof.
Figure 5B:
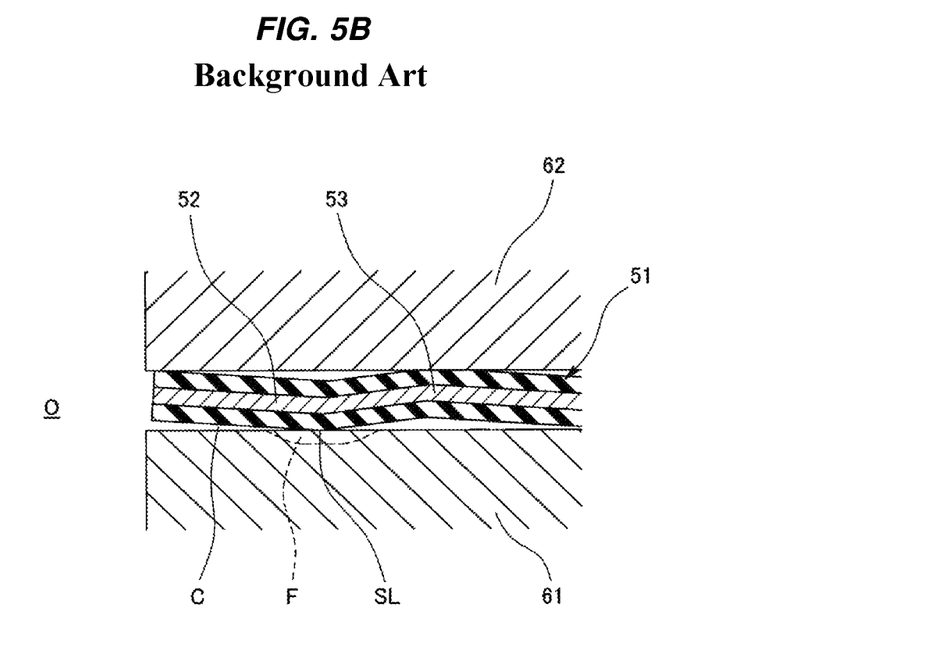

FIG. 5A illustrates a metal gasket 51 according to a conventional example. The metal gasket 51 has a plate-shaped straight portion 52 and a bead portion 53 is integrally provided on the plane of the straight portion 52. FIG. 5B illustrates a state where the metal gasket 51 is sandwiched between a pair of housings 61 and 62 to be elastically deformed. In the state, a crevice c of a wedge-shaped cross section which is opened to a housing outside O is formed between the straight portion 52 and the one housing (lower housing in the figure) 61 as illustrated in the figure. Therefore, when corrosion (crevice corrosion) occurs on the plane of the housing 61 due to the entrance of salt water (not illustrated) of the housing outside O or the like into the crevice c, and then a corrosion portion F penetrates a seal line SL, the seal function is impaired.

Figure 6A:
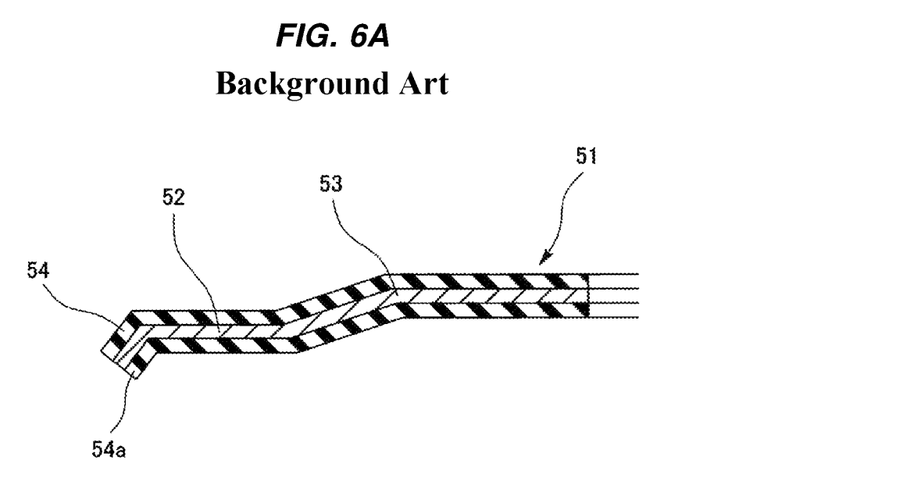
FIG. 6A is a cross-sectional view of a principal portion thereof and FIG. 6B is a cross-sectional view of a principal portion illustrating the attachment state thereof.

In order to prevent a reduction in the seal functional by the corrosion of the housing 61 described above, the applicant of this application has previously proposed the metal gasket 51 illustrated in FIG. 6A (see Patent Document 1).

Figure 6B:
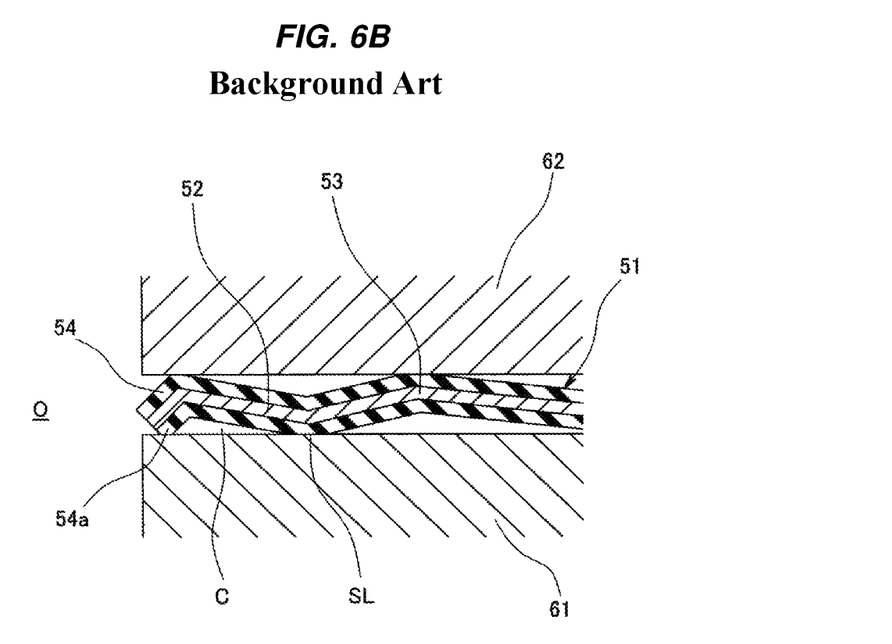

Thus, in the metal gasket 51 of FIG. 6A, the bead portion 53 is provided on the plane of the straight portion 52 and a bent bead portion 54 is provided in an outer peripheral edge portion of the straight portion 52. When the metal gasket 51 is sandwiched between the pair of housings 61 and 62 to be elastically deformed, the bent bead portion 54 contacts the one housing 61 with a tip portion 54a thereof, and therefore the bent bead portion 54 closes the crevice c between the straight portion 52 and the one housing 61 as illustrated in FIG. 6B. Accordingly, salt water (not illustrated) or the like of the housing outside O does not enter the crevice c, and therefore no corrosion occurs in the housing 61 and the seal function reduction can be prevented.

PRIOR ART DOCUMENT

Patent Document

Patent Document 1: Japanese Unexamined Patent Publication No. 2013-61002

SUMMARY OF THE INVENTION

Problem to be Solved by the Invention

In the metal gasket 51 of FIGS. 6A and 6B above, the bead portion 53 provided on the plane of the straight portion 52 functions as an inward seal sealing the internal space of the housings 61 and 62, and the bent bead portion 54 provided in the outer peripheral edge portion of the straight portion 52 functions as an outward seal preventing the entrance of external foreign matter, such as salt water, into the crevice c between the straight portion 52 and the one housing 61. Accordingly, by a double seal structure of such a double bead, an excellent seal effect can be exhibited on the internal space of the housings 61 and 62 and an excellent seal effect can be exhibited also on the external foreign matter. However, as a situation where the metal gasket 51 is attached and used, there is a case where required sealing pressure is low, and thus the double seal structure by the double bead is not required.

In view of the description above, it is an object of the present invention to provide a metal gasket having a structure capable of exhibiting an excellent seal effect on external foreign matter, such as salt water, and moreover having low reaction force compatible with a case where required sealing pressure is low as a situation where the metal gasket is attached and used.

Means for Solving the Problem

In order to achieve the object, a metal gasket of the present invention is sandwiched between a pair of housings and sealing the internal space of the housings and preventing the entrance of external foreign matter into a crevice between the housing and the gasket, and the metal gasket has a straight portion in which the entire surface from an inner peripheral edge portion to an outer peripheral edge portion is formed into a planar shape, in which a bent bead portion provided so as to be directed obliquely outward and contacting one of the housings is integrally provided in the outer peripheral edge portion of the straight portion and the bent bead portion functions as both an inward seal sealing the internal space of the housings and an outward seal preventing the entrance of external foreign matter into the crevice between the housing and the gasket.

In the metal gasket of the present invention having the above-described configuration, the bent bead portion provided so as to be directed obliquely outward and contacting one of the housings is integrally provided in the outer peripheral edge portion of the straight portion, and the entire surface of the straight portion from the inner peripheral edge portion to the outer peripheral edge portion is formed into a planar shape, therefore a bead portion other than the bent bead portion is not provided in the straight portion. Accordingly, the bent bead portion is the only bead in the metal gasket, and the only bead functions as both the inward seal sealing the internal space of the housings and the outward seal preventing the entrance of external foreign matter into the crevice between the housing and the gasket. The reaction force of a seal structure by the only (single) bead is lower than that of a seal structure by a double bead. Accordingly, the present invention can provide a metal gasket having a seal structure of a single bead capable of exhibiting an excellent seal effect on external foreign matter, such as salt water, and moreover having low reaction force compatible with a case where required sealing pressure is low as a situation where the metal gasket is attached and used because the bent bead portion is provided in the outer peripheral edge portion of the straight portion.

It is preferable that the dimension of the bent bead portion provided as the only (single) bead is set so that the bead width is set within the range of 0.5 to 1.3 mm and the rise height is set within the range of 0.25 to 0.7 mm (the reason for which is described later).

Moreover, the entire metal gasket may be a single metal gasket containing only a metal plate but is preferably configured as a metal gasket of a lamination type in which rubber layers are deposited to the surfaces of a metal plate. Thus, the rubber layers contact the housings which are the attachment targets, and therefore an elastic seal effect by the rubber layers can be expected.

Effect of the Invention

The present invention can provide a metal gasket having a structure capable of exhibiting an excellent seal effect on external foreign matter, such as salt water, and moreover having low reaction force compatible with a case where required sealing pressure is low as a situation where the metal gasket is attached and used.

When the required sealing pressure is low, the compressibility can be improved by providing only an outer peripheral bead (or inner and outer peripheral bead), whereby an improvement of salt water sealability and blow hole sealability can be expected.

Since the bead compressibility is excellent, the contact width can be widely secured. With respect to the crevice corrosion by the entrance of salt water, the contact width of the gasket is considered as the cause thereof. Therefore, it is confirmed that the salt water sealability is also improved by removing a main bead. Moreover, the contact width is excellent also when the mating surface has a blow hole or the like, and therefore the effect is exhibited.

BRIEF EXPLANATION OF THE DRAWINGS

FIGS. 1A and 1B are views illustrating a metal gasket according to an embodiment of the present invention, in which

FIGS. 3A and 3B are views illustrating a gasket according to Comparative Example, in which

FIGS. 5A and 5B are views illustrating a metal gasket according to a conventional technique, in which FIGS. 6A and 6B are views illustrating a metal gasket according to a conventional technique, in which

DETAILED DESCRIPTION OF PREFERRED EMBODIMENT

Next, an embodiment of the present invention is described with reference to the drawings.

Figure 1A:
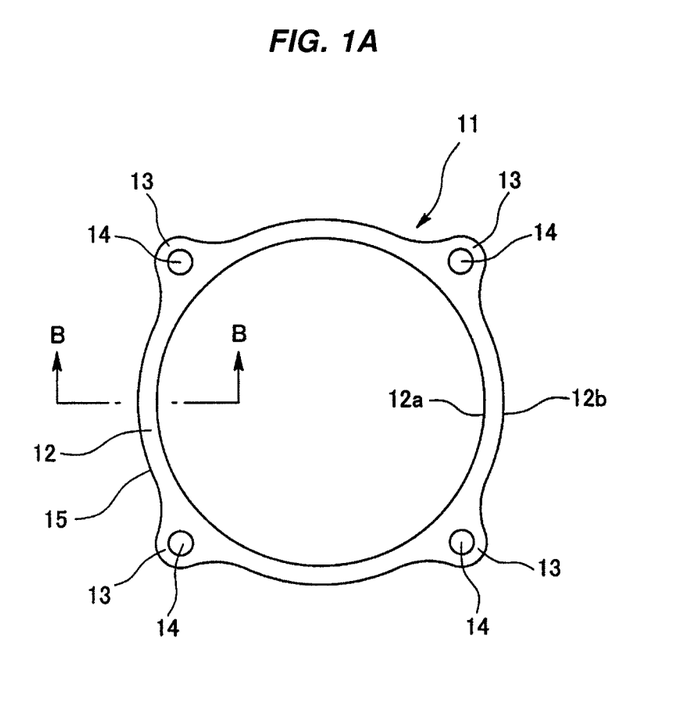
FIG. 1A is a plan view thereof and FIG. 1B is an enlarged cross-sectional view of a principal portion thereof and is an enlarged cross-sectional view along the B-B line of FIG. 1A.
Figure 1B:
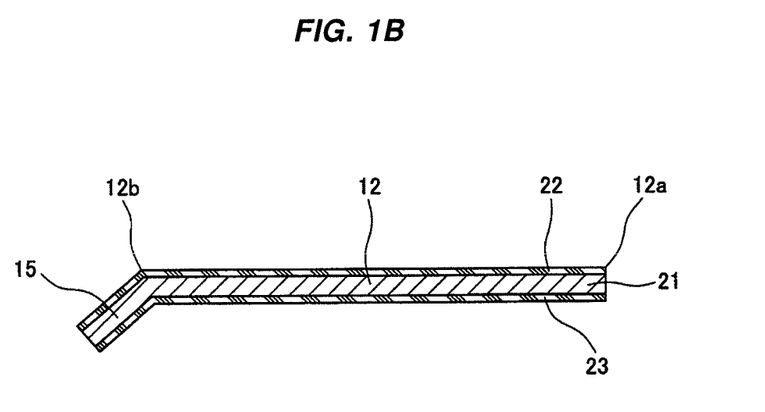

FIGS. 1A and 1B illustrate a metal gasket 11 according to an embodiment of the present invention. The metal gasket 11 according to this embodiment is a plate-shaped metal gasket which has a plane circular shape and is formed into an annular shape. The metal gasket 11 is a gasket which is sandwiched between a pair of housing (not illustrated, refer to FIGS. 5A and 5B or FIGS. 6A and 6B) to be used and, as functions thereof, seals the internal space of the housings and seals external foreign matter, such as salt water and a snow melting agent, and prevents the entrance of the external foreign matter into a crevice between the housing and the gasket 11.

The metal gasket 11 has an annular straight portion 12 which is entirely formed into a planar shape from an inner peripheral edge portion 12a to an outer peripheral edge portion 12b. On the outer peripheral side of the straight portion 12, a plurality of flange portions 13 (Four flange portions are disposed at equal intervals in the figure) on the circumference are integrally provided as a part of the straight portion 12 on the same plane and a bolt hole 14 for passing an assembly bolt (not illustrated) is provided for each flange portion 13.

In the outer peripheral edge portion 12b of the straight portion 12 containing the flange portions 13, a bent bead portion 15 which is formed so as to rise obliquely outward (radially outward and one direction in the thickness direction) from the outer peripheral edge portion 12b is integrally provided. The bent bead portion 15 is provided throughout the entire circumference of the outer peripheral edge portion 12b.

Moreover, the metal gasket 11 has a metal plate (steel plate layer) 21, and rubber layers (surface rubber layer) 22 and 23 each are deposited (bonded) to both the entire surfaces in the thickness direction of the metal plate 21. Therefore, the metal gasket 11 is configured as a metal gasket (rubber coating metal gasket) of a lamination type containing a combination of the metal plate 21 and the rubber layers 22 and 23 in which the rubber layers 22 and 23 are deposited to the surfaces of the metal plate 21.

Figure 2:
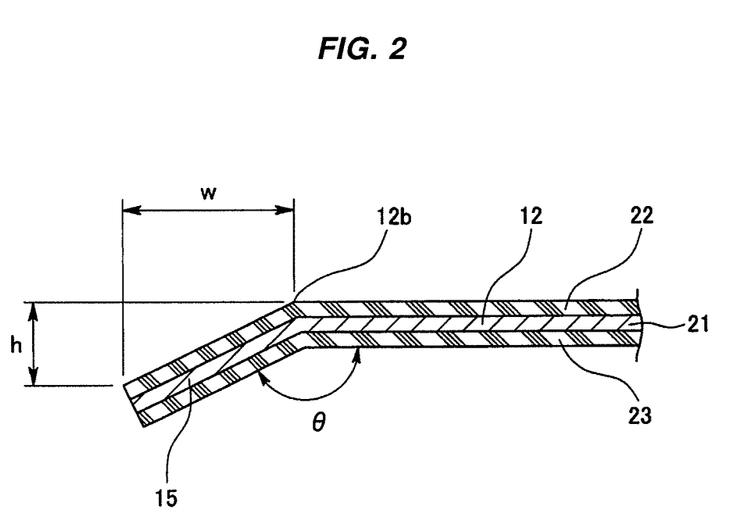
FIG. 2 is an enlarged cross-sectional view of a principal portion of the metal gasket.

As the dimension of the bent bead portion 15, it is preferable that the bead width w is set within the range of 0.3 to 5 mm and the rise height h is set within the range of 0.1 to 5 mm and it is more preferable that the bead width w is set within the range of 0.5 to 1.3 mm and the rise height h is set within the range of 0.25 to 0.7 mm as illustrated in FIG. 2. The reason therefor is as follows.

More specifically, when the width w becomes smaller than 0.5 mm, the compressibility remarkably deteriorates. When the width w exceeds 1.3 mm, the reaction force characteristics remarkably decrease and the seal surface pressure decreases. When the height h becomes smaller than 0.25 mm, the compressibility remarkably deteriorates, and thus the compression is hard to achieve. When the height h exceeds 0.7 mm, high tensile stress acts on the rubber, and thus there is a concern that the rubber cracking occurs. The bent angle θ of the bent bead portion 15 to the straight portion 12 is determined by the trigonometric ratio of the width w and height h.

In the metal gasket 11 having the above-described configuration, the bent bead portion 15 formed so as to rise obliquely outward from the outer peripheral edge portion 12b is integrally provided in the outer peripheral edge portion 12b of the straight portion 12, and the entire surface of the straight portion 12 from the inner peripheral edge portion 12a to the outer peripheral edge portion 12b is formed into a planar shape, and therefore a bead portion other than the bent bead portion 15 is not provided in the straight portion 12. Accordingly, the bent bead portion 15 is the only seal bead in the metal gasket 11 and the bent bead portion 15 which is the only seal bead functions as both an inward seal sealing the internal space of the housings and an outward seal sealing external foreign matter, such as salt water and a snow melting agent, and preventing the entrance of the external foreign matter into a crevice between the housing and the gasket 11. The reaction force of a seal structure by the only (single) bead can be set to be lower than that of a seal structure by a double bead. Accordingly, the metal gasket 11 can be provided with a seal structure of a single bead, which is capable of exhibiting an excellent seal effect on external foreign matter, such as salt water, and moreover has low reaction force compatible with a case where required sealing pressure is low as a situation where the metal gasket 11 is attached and used because the bent head portion 15 is provided in the outer peripheral edge portion 12b of the straight portion 12.

The low reaction force is as follows when given by a comparison test.

Figure 3A:
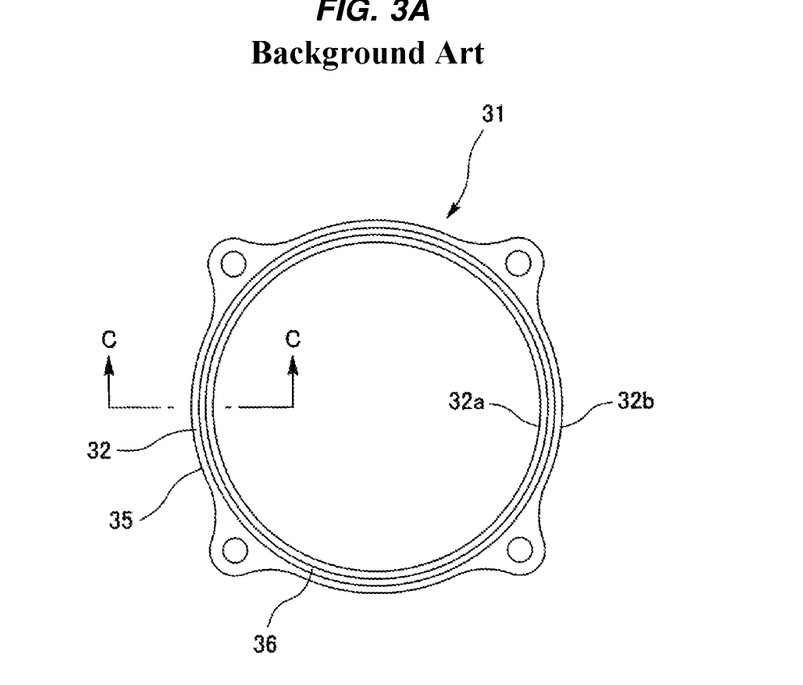
FIG. 3A is a plan view thereof and FIG. 3B is an enlarged cross-sectional view of a principal portion thereof and is an enlarged cross-sectional view along the C-C line of FIG. 3A.
Figure 3B:
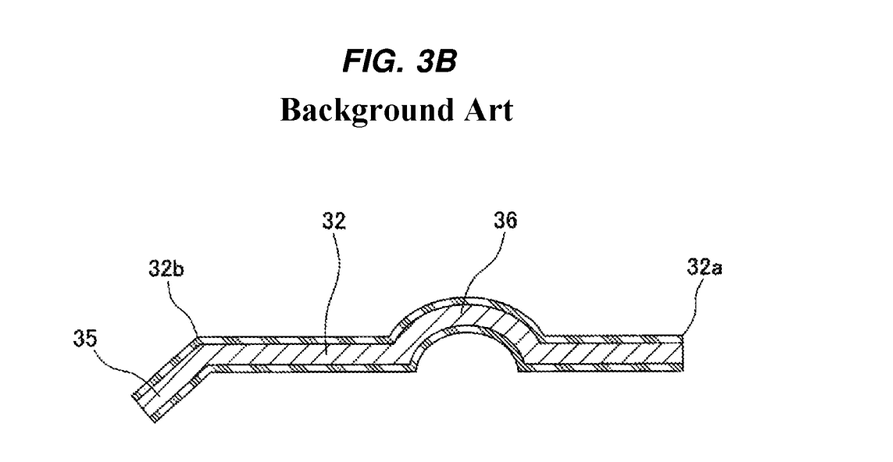

More specifically, FIGS. 3A and 3B illustrate a metal gasket 31 according to Comparative Example. In the metal gasket 31, a bent bead portion 35 formed so as to rise obliquely outward from an outer peripheral edge portion 32b of a straight portion 32 is integrally provided in the outer peripheral edge portion 32b and, in addition thereto, a bead portion 36 containing a full bead is provided on the plane of the straight portion 32.

Figure 4:
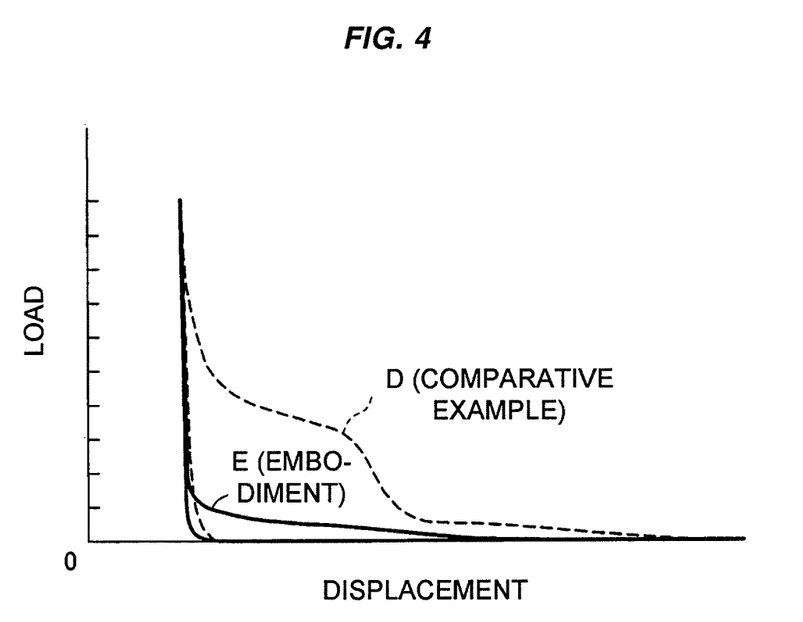
FIG. 4 is a graph drawing illustrating comparison test results.

In the metal gasket 31 according to this Comparative Example, both the bent bead portion 35 and the bead portion 36 containing a full bead are compressed in attachment, and therefore the relationship between the load and the displacement is as shown by the dotted line D in the graph drawing of FIG. 4. On the other hand, in the metal gasket 11 according to the above-described embodiment, only the bent bead portion 15 is compressed in attachment, and therefore the relationship between the load and the displacement is as shown by the solid line E in the graph drawing of FIG. 4. Therefore, as is understood from the comparison, according to the metal gasket 11 according the above-described embodiment, a large displacement can be obtained by a fixed load, and thus the characteristics of the low reaction force are set.

Furthermore, the bead portion 36 containing a full bead is omitted in the metal gasket 11 according to the above-described embodiment in comparison with Comparative Example, and therefore the width in the radial direction of the gasket 11 can be reduced. Accordingly, the gasket 11 can be attached also to a product in which the plane width of a gasket attachment portion is narrow.

Moreover, the compressibility is excellent similarly in comparison with Comparative Example, and therefore the interval between the pair of housings can be narrowed, and thus salt water and the like are difficult to enter, and therefore the crevice corrosion is difficult to occur. Moreover, only the bent bead portion 15 is compressed between the pair of housings, and therefore the seal surface pressure can be centralized, and thus the sealability can be improved. The moldability of the gasket can be designed without increasing the gasket reaction force even when the degree of plane of the housings is poor because the steel plate is not spread.

DESCRIPTION OF REFERENCE NUMERALS 11 metal gasket
12 straight portion
12a inner circumferential edge portion
12b outer circumferential edge portion
13 flange portion
14 bolt hole
15 bent bead portion
21 metal plate
22, 23 rubber layer

What is claimed is:
1. A metal gasket assembly comprising:
an annular metal gasket; and
a pair of housings, wherein
when the annular metal gasket is sandwiched between the pair of housings, the annular metal gasket seals an internal space of the housings and prevents entrance of external foreign matter into a crevice between one of the housings and the annular metal gasket,
the annular metal gasket includes:
an annular straight portion in which an entire surface from an inner peripheral edge portion to an outer peripheral edge portion is formed into a planar shape;
a plurality of flange portions integrally provided as a part of the annular straight portion on a same plane, and the plurality of flange portions protrudes parts of the outer peripheral edge portion;
a bolt hole provided in each of the plurality of flange portions; and
a bent bead portion provided so as to be directed obliquely outward and contacting the one of the housings, and the bent bead portion is integrally provided in the outer peripheral edge portion of the annular straight portion including the plurality of flange portions,
the bent bead portion is provided throughout an entire outer peripheral edge of the annular straight portion including the plurality of flange portions,
the bent bead portion functions as both an inward seal sealing the internal space of the housings and an outward seal preventing the entrance of the external foreign matter into the crevice between the one of the housings and the annular metal gasket,
an outer end of the bent bead portion of the annular metal gasket is exposed to an outside of the pair of housings where the external foreign matter that includes salt water exists,
the bent bead portion is an only bead in the annular metal gasket and a bending point of the annular straight portion and the bent bead portion is an only bending point in the annular metal gasket, and
in the bent bead portion, a bead width from the outer peripheral edge portion to an outermost peripheral edge of the annular metal gasket is set within a range of 0.5 to 1.3 mm and a rise height is set within a range of 0.25 to 0.7 mm.

2. The metal gasket assembly according to claim 1, wherein
the annular metal gasket is an annular metal gasket that is laminated, in which rubber layers are deposited to surfaces of a metal plate.

3. The metal gasket assembly according to claim 2, wherein
the metal plate of the annular metal gasket is made of steel.

4. The metal gasket assembly according to claim 1, wherein
the bead width is less than a width of the annular straight portion.

5. The metal gasket assembly according to claim 1, wherein
a bent angle between the bent bead portion and the annular straight portion is defined by a trigonometric formula:

$$\theta = 180° - \tan^{-1}(h/w),$$

where
θ is the bent angle,
h is the rise height, and
w is the bead width.

6. The metal gasket assembly according to claim 5, wherein
when the bead width is within the range of 0.5 to 1.3 mm and the rise height is within the range of 0.25 to 0.7 mm, a range of the bent angle calculated according to the trigonometric formula is within 125.5° to 169.1°.

7. The metal gasket assembly according to claim 1, wherein
the plurality of flange portions is disposed at equal intervals around a circumference of the annular metal gasket.

8. The metal gasket assembly according to claim 7, wherein
the plurality of flange portions includes four flange portions.

9. The metal gasket assembly according to claim 1, wherein
the bent bead portion extends obliquely downward in a linear direction from the outer peripheral edge portion of the annular straight portion.

10. The metal gasket assembly according to claim 1, wherein
the inner peripheral edge portion of the annular straight portion forms an outer periphery of a circular opening of the annular metal gasket.

11. The metal gasket assembly according to claim 1, wherein
in a cross section of the annular metal gasket, an entirety of the bent bead portion extends in a single direction so that a single bent angle is formed between the bent bead portion and the annular straight portion, and the bead width is only measured in the bent bead portion.

12. The metal gasket assembly according to claim 1, wherein
the bead width is measured from an outermost peripheral edge on a top surface of the annular metal gasket to an edge between the bent bead portion and the annular straight portion that is on the top surface of the annular metal gasket, and the bead width is measured in a direction in which the annular straight portion extends.

13. The metal gasket assembly according to claim 1, wherein
the rise height is measured from an outermost peripheral edge on a top surface of the annular metal gasket to an edge between the bent bead portion and the annular straight portion that is on the top surface of the annular metal gasket, and the rise height is measured in a direction perpendicular to a direction in which the annular straight portion extends.

14. The metal gasket assembly according to claim 1, wherein
the pair of housings include an aluminum material, and
the bent bead portion prevents entrance of the salt water into the crevice between the one of the housings and the annular metal gasket, to prevent corrosion in the crevice due to ionization of the aluminum material by the salt water.

15. An annular metal gasket which is sandwiched between a pair of housings and seals an internal space of the housings and prevents entrance of external foreign matter into a crevice between one of the housings and the annular metal gasket, the annular metal gasket comprising:
an annular straight portion in which an entire surface from an inner peripheral edge portion to an outer peripheral edge portion is formed into a planar shape;
a plurality of flange portions integrally provided as a part of the annular straight portion on a same plane, and the plurality of flange portions protrudes parts of the outer peripheral edge portion;
a bolt hole provided in each of the plurality of flange portions; and
a bent bead portion provided so as to be directed obliquely outward and contacting the one of the housings, and the bent bead portion is integrally provided in the outer peripheral edge portion of the annular straight portion including the plurality of flange portions,
the bent bead portion is provided throughout an entire outer peripheral edge of the annular straight portion including the plurality of flange portions,
the bent bead portion functions as both an inward seal sealing the internal space of the housings and an outward seal preventing the entrance of the external foreign matter into the crevice between the one of the housings and the annular metal gasket,
the bent bead portion is an only bead in the annular metal gasket and a bending point of the annular straight portion and the bent bead portion is an only bending point in the annular metal gasket,
an outermost peripheral end surface of the bent bead portion is an exposed surface that is exposed to an outside of the pair of housings where the external foreign matter that includes salt water exists, and
in the bent bead portion, a bead width from the outer peripheral edge portion to an outermost peripheral edge of the annular metal gasket is set within a range of 0.5 to 1.3 mm and a rise height is set within a range of 0.25 to 0.7 mm.

16. The annular metal gasket according to claim 15, wherein
the pair of housings include an aluminum material, and
the bent bead portion prevents entrance of the salt water into the crevice between the one of the housings and the annular metal gasket, to prevent corrosion in the crevice due to ionization of the aluminum material by the salt water.

* * * * *